(12) United States Patent  
Dai et al.

(10) Patent No.: US 7,777,478 B2
(45) Date of Patent: Aug. 17, 2010

(54) TOUCH AND AUDITORY SENSORS BASED ON NANOTUBE ARRAYS

(75) Inventors: Liming Dai, Beavercreek, OH (US); Toshiyuki Ohashi, Washington Township, OH (US)

(73) Assignees: University of Dayton, Dayton, OH (US); Honda Motor Co., Ltd., Tokyo (JP)

( * ) Notice: Subject to any disclaimer, the term of this patent is extended or adjusted under 35 U.S.C. 154(b) by 453 days.

(21) Appl. No.: 11/759,626

(22) Filed: Jun. 7, 2007

(65) Prior Publication Data

US 2008/0129278 A1 Jun. 5, 2008

Related U.S. Application Data

(60) Provisional application No. 60/811,942, filed on Jun. 8, 2006.

(51) Int. Cl.
*G01R 29/22* (2006.01)
(52) U.S. Cl. ........................ 324/109; 977/953
(58) Field of Classification Search .................. None
See application file for complete search history.

(56) References Cited

U.S. PATENT DOCUMENTS

| 5,872,422 | A | 2/1999 | Xu et al. |
| 6,286,226 | B1 | 9/2001 | Jin |
| 6,445,006 | B1 | 9/2002 | Brandes et al. |
| 6,737,939 | B2 | 5/2004 | Hoppe et al. |
| 6,756,795 | B2 * | 6/2004 | Hunt et al. .................. 324/701 |
| 2004/0004485 | A1 | 1/2004 | Lee et al. |
| 2006/0134883 | A1 * | 6/2006 | Hantschel et al. ........... 438/458 |

FOREIGN PATENT DOCUMENTS

| EP | 1 342 925 A2 | 9/2003 |
| WO | 2004052973 A2 | 6/2004 |

OTHER PUBLICATIONS

Annex to Form PCT/ISA/206 Communication Relating to the Results of the Partial International Search for International application No. PCT/US2007/013579 dated Aug. 21, 2008.

* cited by examiner

*Primary Examiner*—Minh N Tang
(74) *Attorney, Agent, or Firm*—Dinsmore & Shohl LLP

(57) ABSTRACT

A sensor including at least one sensor probe including a pair of electrodes; a vertically aligned nanotube disposed between the pair of electrodes; optionally a piezoelectric polymer on the nanotube; and optionally, a field source for generating a field, the field source operatively connected to the pair of electrodes; whereby when the sensor probe is contacted, a change in the field occurs or electricity is generated. Methods of using the sensors are also described.

11 Claims, 17 Drawing Sheets

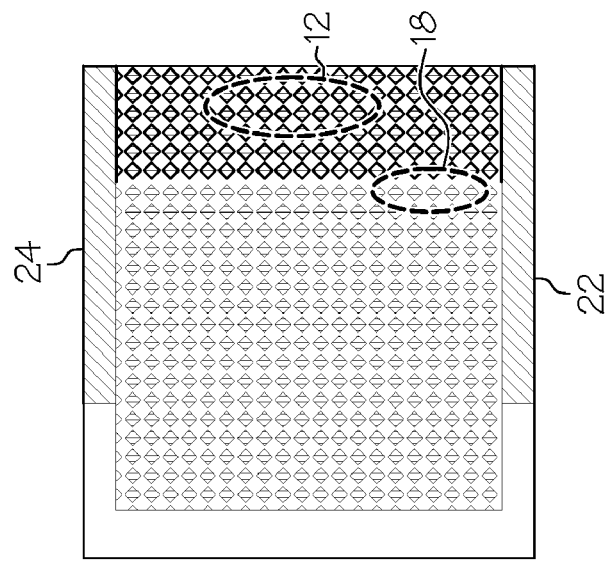
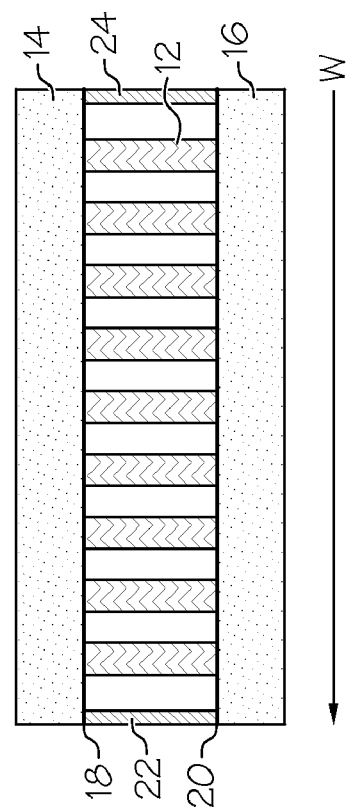
FIG. 1B
FIG. 1A

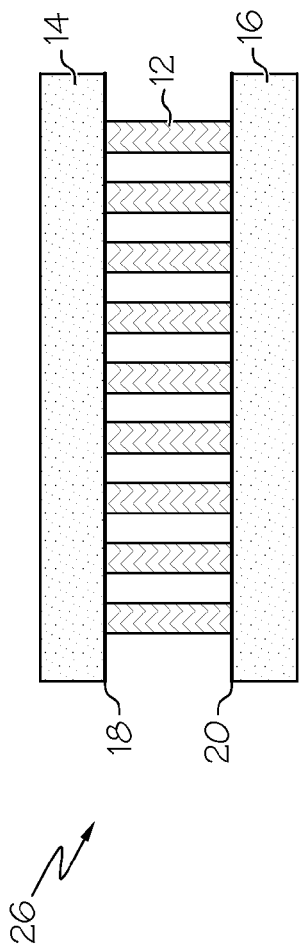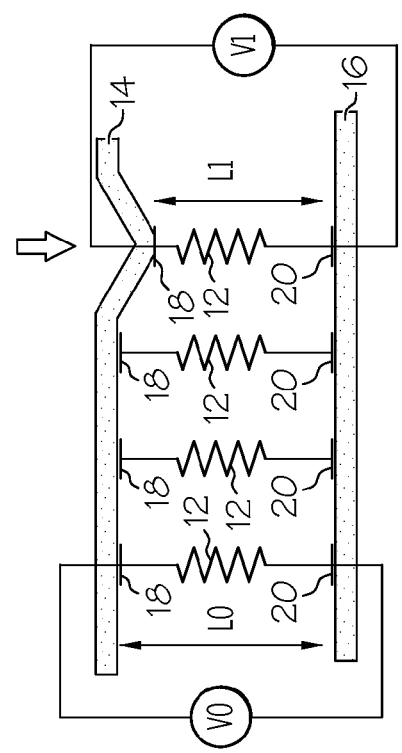
FIG. 2A
FIG. 2B

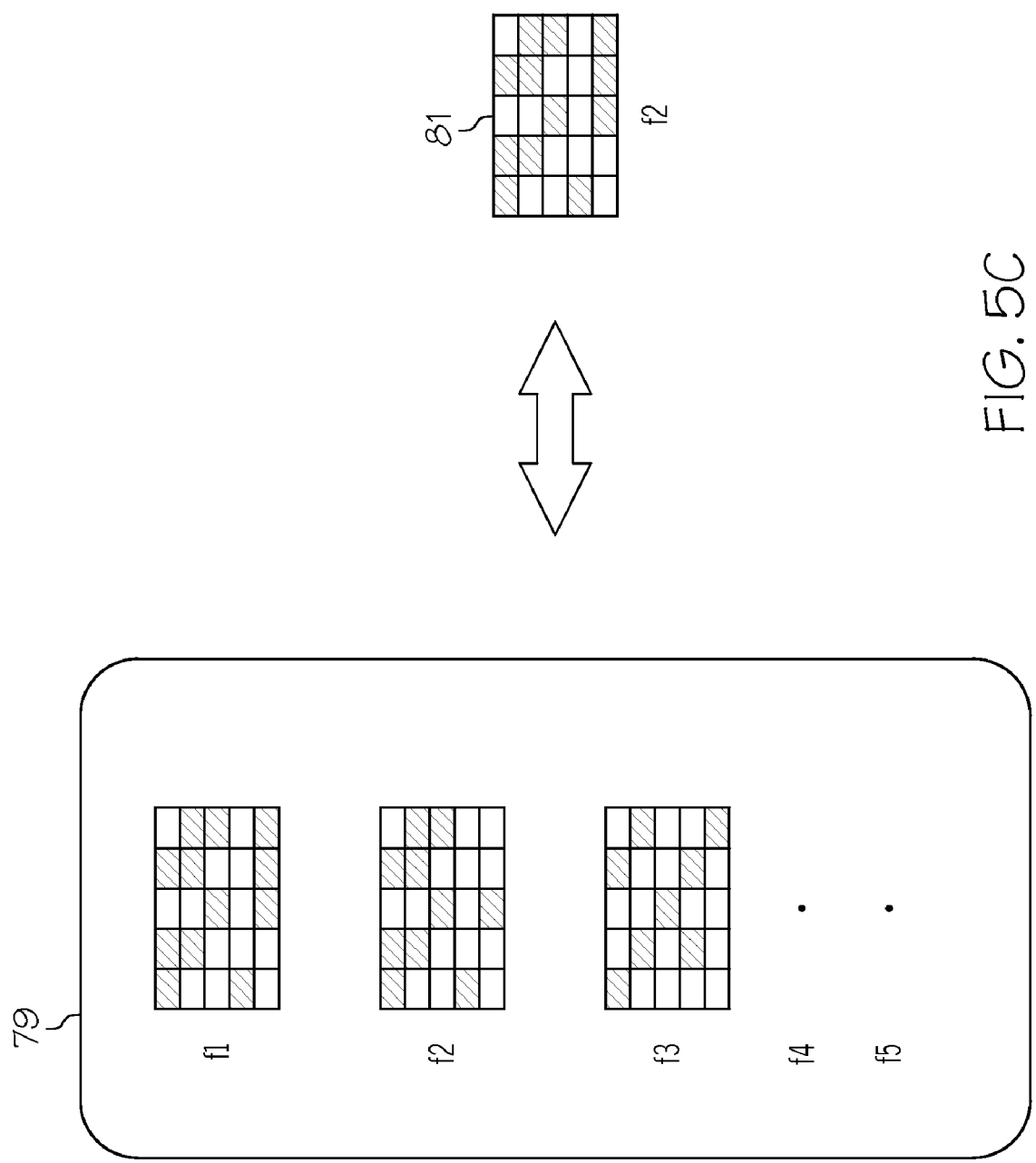

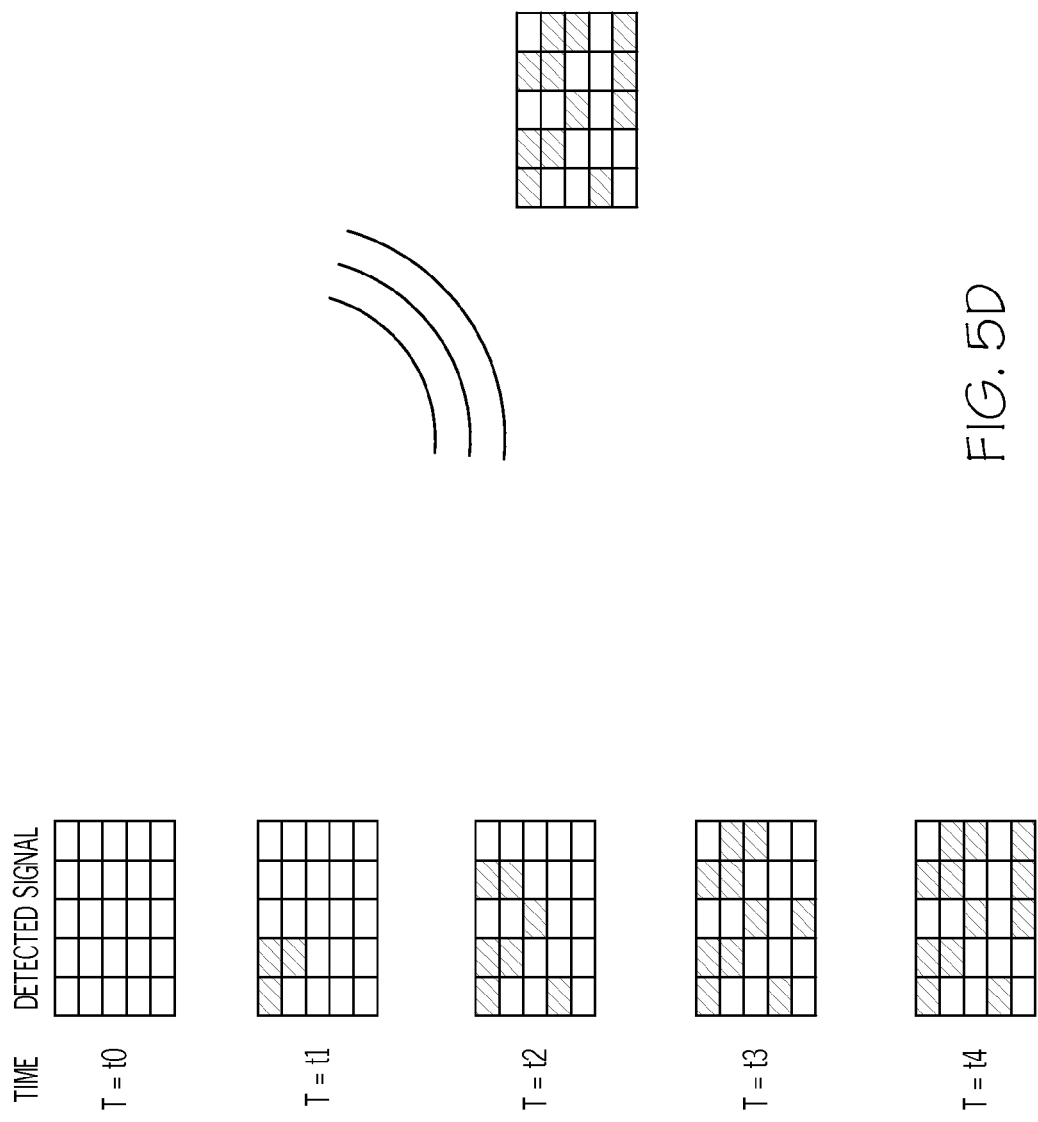

TOUCH AND AUDITORY SENSORS BASED ON NANOTUBE ARRAYS

CROSS-REFERENCE TO RELATED APPLICATIONS

This application claims the benefit of provisional application Ser. No. 60/811,942 entitled Touch And Auditory Sensors Based On Carbon Nanotube Arrays, filed Jun. 8, 2006, which is incorporated herein by reference.

FIELD OF THE INVENTION

This invention relates generally to touch and auditory sensors, and in particular, to touch and auditory sensors using nanotube arrays.

BACKGROUND OF THE INVENTION

Nanostructured materials have opened the door to realizing devices with ultra-miniature sizes and ultra low electric consumptions, which conventional materials could not have achieved. Nanostructured materials, which can be defined as materials with crystallite sizes less than 100 nm in dimension, are typically synthesized by either "bottom-up" or "top-down" processes. The bottom-up process starts with atoms, ions or molecules as "building blocks" and assembles nanoscale clusters or bulk material from them. The "top-down" methods for processing of nanostructured materials involve starting with a bulk solid and obtaining a nanostructure by structural decomposition. One such approach involves the lithography/etching of bulk material analogous to the processes used in the semiconductor industry wherein devices are formed out of an electronic substrate by pattern formation (such as electron beam lithography) and pattern transfer processes (such as reactive ion etching) to make structures at the nanoscale.

Carbon nanotubes (CNTs) are expected to be adopted for many applications because of their superior electrical and mechanical characteristics. Moreover, their unique structures are also attractive for sensor applications. For example, in the case of using semi conducting CNTs as a sensor, it is possible to identify gases based on the selection of a donor or an acceptor by control of electron charity. In contrast, conventional gas sensors only detect the change of the electric resistance by gas absorption. However, as this new type of sensor uses only one CNT as a sensor probe for detection of gases, many difficulties remain in producing such a device.

For example, in order to produce the gas sensor described above, the CNT must be isolated from the carbon soot that was prepared, and it must be moved and set on a desirable point via a "manipulation" process. Today, the manipulations of CNTs are performed using hand-made nano-tweezers used in a transmitting electron microscope (TEM), and carried out using the "top-down" method in this special and limited environment. However, these operations are not adaptable to make uniform devices or to set a plurality of sensors on one chip.

On the other hand, a gas sensor containing an anode with a vertically aligned CNT array and a cathode has been reported in the prior art. The sensor works by applying a DC voltage to two electrodes, and flowing gas between those electrodes. Ionized gas produced by the voltage affects a breakdown voltage of the CNT array. By observing the differences in the breakdown voltage, the type of gas can be identified.

Vertically aligned CNT arrays are currently produced using the "bottom-up" method. In particular, the CNT arrays are generally made using a chemical vapor deposition (CVD) process with catalysts, namely the pyrolysis of compounds containing a carbon source and catalyst elements. Based on these CNT arrays, CNTs with proper alignment are produced easily, such that a plurality of sensors can be set on single chip.

Other sensors based on CNT arrays have been disclosed in the prior art. For example, U.S. Patent Application Publication No. 2004/0004485 discloses a sound sensor to detect sounds by observing a change in capacitance between two CNTs which face each other. Bias voltages are necessary to detect signals. Because the disclosed CNTs made on the electrodes have uniform lengths, the sensor is only useful for detecting a specific frequency. U.S. Pat. No. 6,737,939 discloses a radio frequency (RF) filter device which uses a CNT array on a substrate. The CNT array also contains CNTs that are uniform in length and cross section. By loading a bias voltage to the RF filter device, electrons on the CNT surface are increased. As a result, a quantum effect is caused which changes the lengths of the CNTs on the device, thereby changing a frequency for detection. U.S. Pat. No. 6,445,006 extends a CNT array disclosed by U.S. Pat. No. 5,872,422 for a Field Emission Display (FED) to detection applications used in micro-devices, such as Micro-Electro-Mechanical System (MEMS) based devices like an accelerometer or a flow meter. The disclosed detection principle is the physical contact originated between two CNTs electrically or the change of capacitance between them. U.S. Pat. No. 6,286,226 discloses a touch sensor using a CNT array to detect electronically a physical contact. However, a bias voltage is necessary to be loaded first.

Therefore, there remains a need for improved touch and auditory sensors.

SUMMARY OF THE INVENTION

The present invention meets this need by providing touch and auditory sensors based on nanotube arrays. The sensor includes at least one sensor probe comprising: a pair of electrodes; a vertically aligned nanotube disposed between the pair of electrodes; optionally a piezoelectric polymer on the nanotube; and optionally, a field source for generating a field, the field source operatively connected to the pair of electrodes; whereby when the sensor probe is contacted, a change in the field occurs or electricity is generated.

Another aspect of the invention is a method of detecting touch or sound. The method includes providing a sensor comprising: at least one sensor probe comprising: a pair of electrodes; a vertically aligned nanotube disposed between the pair of electrodes; optionally a piezoelectric polymer on the nanotube; and optionally, a field source for generating a field, the field source operatively connected to the pair of electrodes; whereby when the sensor probe is contacted, a change in the field occurs or electricity is generated; contacting the sensor probe causing a change in the field or generating electricity; and detecting the change in the field or the electricity generation.

BRIEF DESCRIPTION OF THE DRAWINGS

A better understanding of the present invention will be had upon reference to the following description in conjunction with the accompanying drawings in which like reference numerals represent like parts, and wherein:

FIG. 1A is a schematic cross-section of a touch sensor using a helical nanotube array;

FIG. 1B is a schematic partial top plan view of the touch sensor of FIG. 1B;

FIG. 2A is a schematic cross-section of a touch sensor using a helical nanotube array;

FIG. 2B is a schematic of the of the touch sensor of FIG. 2A in operation;

FIG. 5C is a schematic illustration for signal processing on an auditory sensor (frequency separation);

FIG. 5D is a schematic illustration for signal processing on an auditory sensor (sound localization);

DETAILED DESCRIPTION

Figure 3B:
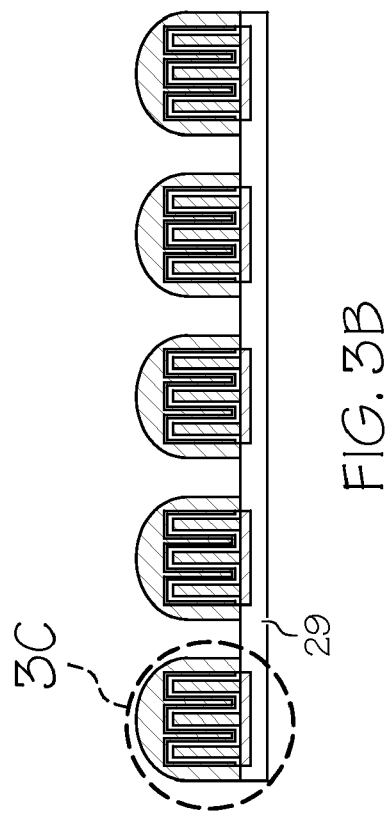
FIG. 3B is an enlarged cross-section of a portion of the touch sensor of FIG. 3A.

The following description of the embodiments of the invention directed to touch and auditory sensors based on nanotube arrays are merely exemplary in nature, and is in no way intended to limit the invention or its applications or uses.

For ease of discussion, in the following examples the nanotube arrays will be referred to as carbon nanotube (CNT) arrays. However, those of skill in the art will recognize that the nanotubes are not limited only to carbon nanotubes and that other types of nanotubes can also be used. That is, any material that forms metal or oxide or polymer nanotubes with structures having a vertically aligned array may be used in the sensors of the present invention. Suitable materials include but are not limited to semiconductors, conductive and non-conductive materials known in the field. Suitable materials include but are not limited to oxides, carbides, nitrides, borides, or mixed ceramics. For example, the selection of material in the case of an auditory sensor can be based on the resonance corresponding to a desirable frequency for detection. Accordingly, it is envisioned that silicon nanotubes are promising for this purpose.

In one embodiment depicted by FIGS. 1A and 1B, a CNT array is used as a touch sensor 10. The touch sensor 10 shown in FIG. 1 uses helical shaped CNTs as the CNT array 12. It is to be appreciated that the center axes of the helical CNTs in the array 12 are vertically aligned on at least one substrate. As shown in FIGS. 1A and 1B, the helical CNT array 12 is provided in the structure vertically between two substrates 14, 16 each having a plurality of electrodes 18, 20. Permanent magnets 22, 24 are provided such that a magnetic field (W) is normal to an axis of the helical CNT array, between the two substrates as shown. In the helical CNT array 12, each individual helical CNT or a bundled helical CNT pattern, with a size ranging from micro-meters to nano-meters, functions as a touch sensor probe. The electrodes 18, 20 on each of the substrates 14, 16 correspond in number to the number of helical CNTs or bundled helical CNT patterns, and the corresponding electrodes and CNTs together form sensing units on the two substrates. The substrates 14, 16 comprise elastomers, for example, to add softness and resistance to wear and tear to the touch sensor 10, if desired.

Although not wishing to be bound by theory, it is believed that the moving theory is as explained as follows. When an external force is applied to a surface portion of one of the elastomer substrates 14 or 16, electricity is generated from the provided magnetic field (W) and the applied external force according to Fleming's right hand law. By referencing the distribution of the generated electricity (I) on the whole of array, the location on which the external force was applied can be identified.

In another embodiment shown in FIGS. 2A and 2B, a touch sensor 26 in which a helical CNT array 12 is also used. However, in this touch sensor 26, in place of the permanent magnets, bias voltages are applied between the two electrodes 18, 20 provided on elastomer substrates 14, 16. When an external force F is loaded to a surface portion of one of the elastomers, the length of the corresponding helical CNT or a bundled helical CNTs provided by the surface portion is changed from $L_0$ to $L_1$. It is to be appreciated that this change in the length affects an inductance of the CNT or bundled helical CNTs. As the result, the bias voltage is changed from a non-loading voltage $V_0$ to a loading voltage $V_1$. By identifying the location at which the voltage has changed, the place on the surface of the elastomer to which the external force is loaded can be detected.

Figure 3C:
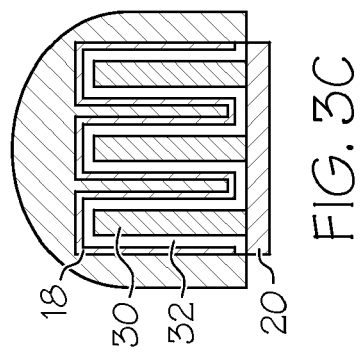
FIG. 3C is an enlarged cross-section of a portion of the touch sensor of FIG. 3B.
Figure 3A:
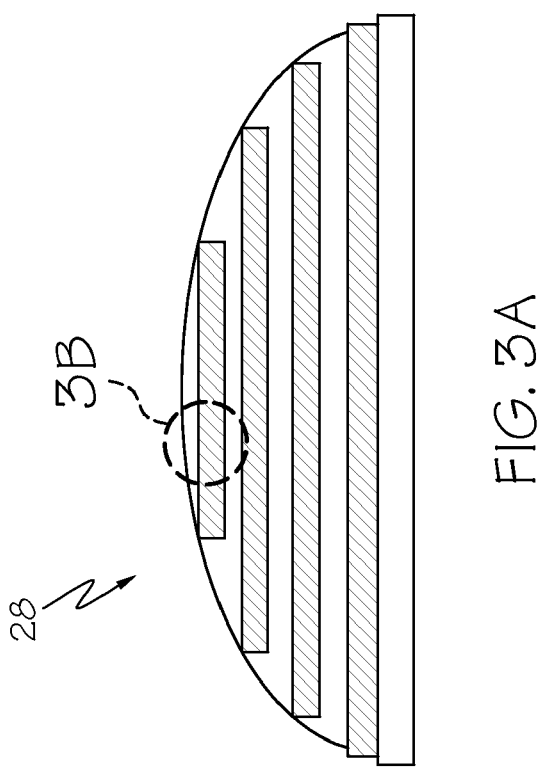
FIG. 3A is a schematic of a touch sensor using a nanotube array.

In still another embodiment, FIGS. 3A, 3B, and 3C disclose a touch sensor 28 having a straight CNT array 30 coated by a piezoelectric polymer 32, which is used as touch sensor probes. As shown, the axes of the CNTs in the array 30 are vertically aligned on a substrate 29. As an example, the CNT array 30 can be produced by a synthetic method using pyrolysis of iron phthalocyanine ($FeC_{32}N_8H_{16}$). In one embodiment, the piezoelectric polymer 32 is polyvinylidene fluoride (PVDF), for example. For convenience during grasping and protection from wear during contact in the robotic application, the probes are embedded into elastomer A in the shape of a minute protuberance ("micropoint"). Moreover, a number of micropoints are made on the surface of elastomer B. To provide the robot hands 34, 36 with an improved grasping surface, in one embodiment, elastomer A is softer than elastomer B in elastic modulus. As an example of these elastomers, a silicone rubber can be used, wherein the desired elastic modulus, as an example, can be adjusted by adding graphite to the silicone rubber. By the use of this structure, the real surface area of the piezoelectric polymer 32 on the probe increases by about 1000 times, thereby enlarging sensor sensitivity and decreasing cost by minimization of consumption on the coating materials.

Figure 3D:
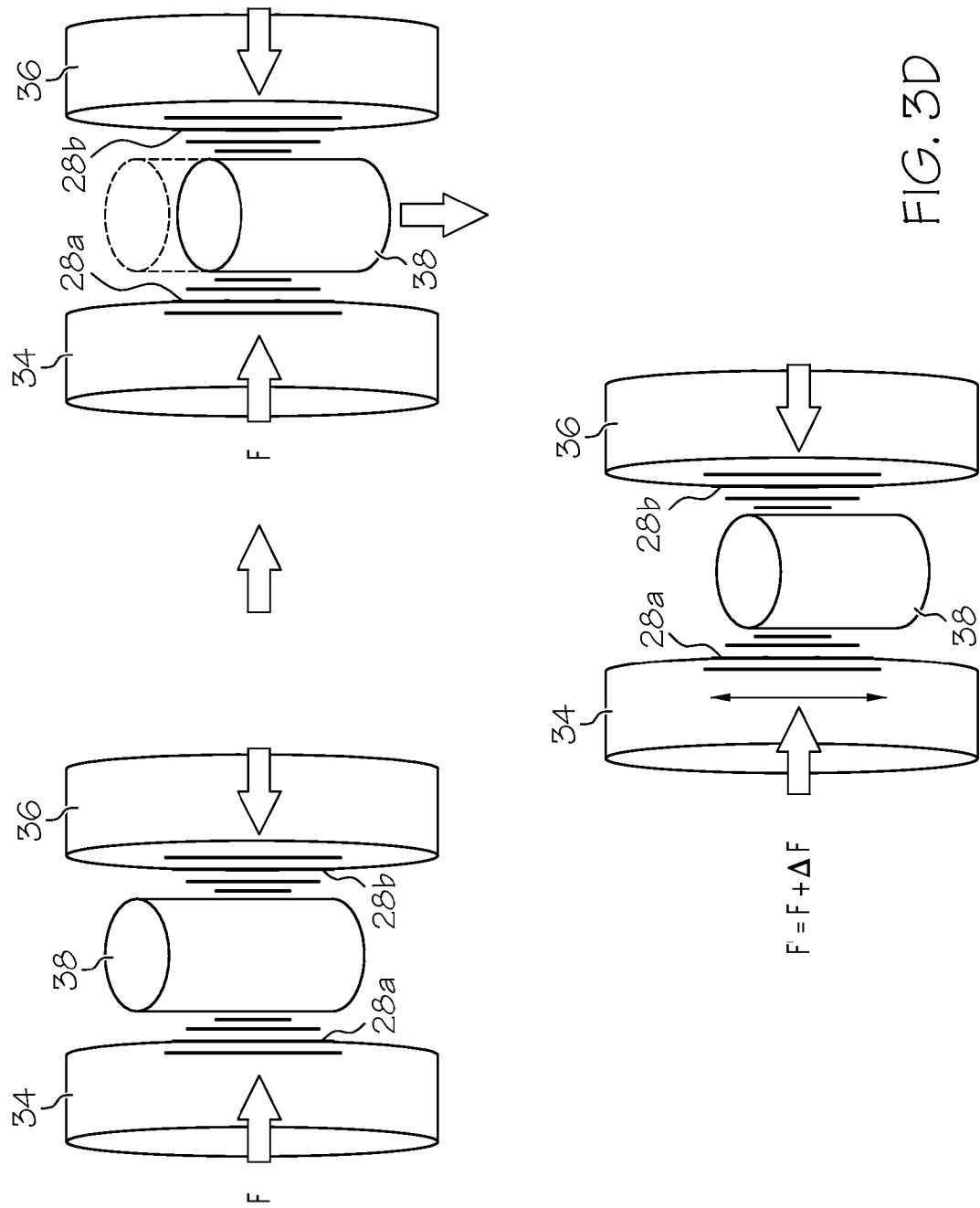
FIG. 3D is an illustration of the operation of the touch sensor shown in FIG. 3A.

Although not wishing to be bound by theory, it is believed that the moving theory of this sensor is as explained as follows. As is shown in FIG. 3D, two touch sensors 28a, 28b are set on each robot hand 34, 36 which are arranged face to face, and the process of grasping an object 38 is set up. The robot hands 34, 36 are holding the object 38, such as an empty glass, stably by force (F). Next, water is poured into the glass, changing the weight of the object 38. As a result, the object 38 falls from the robot hands 34, 36 towards the ground with a minute slip. At the moment of the slip in the robot hands 34, 36, the sensor probes 28a, 28b at the slip point detect a high frequency pulse and transmit a signal to a circuit (not shown) to control the grasping force (F). The circuit responds to the received signal, loading new force (F'), which is an increase (ΔF) that is added to grasping force (F), such that the robot hands 34, 36 grasp the slipping glass after the weight change.

Figure 4:
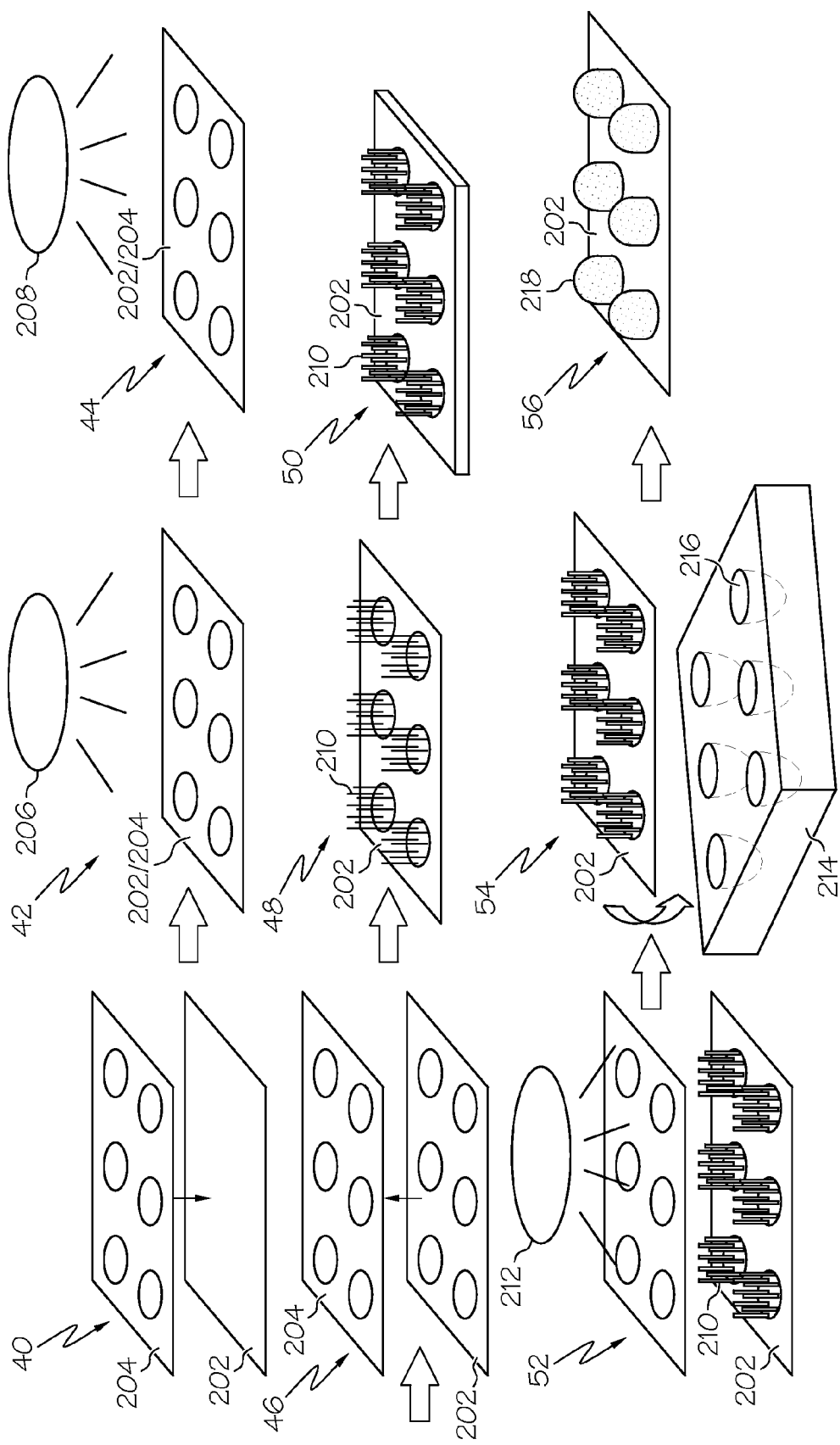
FIG. 4 is an illustration of a process for making a touch sensor using nanotube arrays.

One illustrative process of making the touch sensor shown in FIGS. 3A, 3B, and 3C is shown in FIG. 4. In step 40, a substrate 202 is masked using a physical mask 204 (e.g., a grid mesh for TEM). In step 42, a material for an electrode 206 (e.g., Au) is deposited on the substrate. Next, in step 44, catalytic metals 208, including, but not limited to, Fe, Ni, Mo and Co, are deposited on the surface of the substrate 202 with the electrode 206 deposited thereon. Then in step 46, the physical mask 204 is removed, and desirable patterns of the metals are built on the substrate 202. The substrate 202 is then inserted into a furnace in step 48, and the CNT arrays 210 grow on the substrate using a carbon source (e.g., acetylene) at high temperature. After the substrate 202 cools down, in step 50, a functional polymer, including but not limited to, PVDF is coated using a mask with a spin coating or plasma polymerization applied to the surface of patterns of CNT arrays 210. Then in step 52, a material for an electrode 212 (e.g., Au) is deposited on the surface of polymer-coated CNT patterns. After this process, the mask is removed and the substrate 202 is set into a mold 214 with many circular cavities 216 provided with a liquid silicone rubber in step 54 to provide protuberances to the surface of the touch sensor. In step 56, the mold is removed after solidification of the elastomer, thereby providing the micropoints of CNTs 218 on the substrate 202.

Figure 5B:
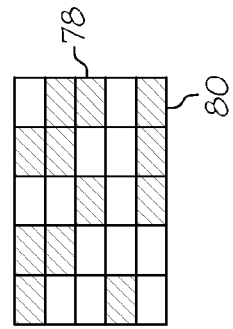
FIG. 5B is an illustration of a detected signal for the auditory sensor of claim 5A.
Figure 5A:
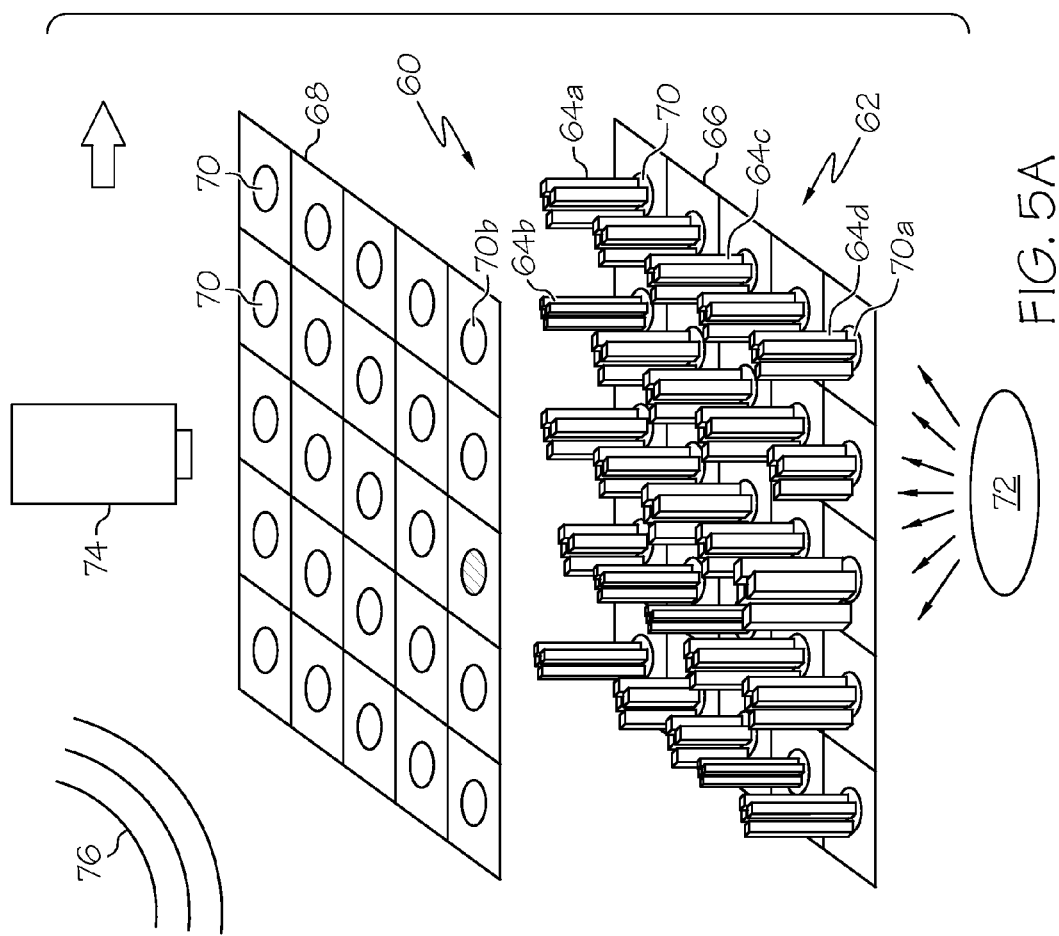
FIG. 5A is a schematic of an auditory sensor using nanotube arrays.

In another embodiment, an auditory sensor 60 using a CNT array 62 is provided as shown in FIGS. 5A and 5B. A plurality of auditory sensor probes 64a, 64b, 64c, etc., with different forms provided between a pair of optically transparent substrates 66, 68 (e.g., SiO$_2$) having holes 70. By the term "different forms" it is meant that the distinctions between the various auditory sensor probes vary in physical parameters such as diameter, length, and elastic modulus. The different forms contribute to each of the auditory sensor probes having a sensitivity to a particular resonant frequency(ies). Specifically, several frequencies in a sound wave are divided among various nanotubes probes provided between the optical transparent substrates 66, 68. This is similar to the frequency selectivity which depends on the point on a basilar membrane in a cochlea in human. The theory of detection is introduced as follows.

A method of detecting frequencies is provided by observing the existences of light 72 (e.g., from a light source) passing through the holes 70 of each of the substrates 66, 68 using a light detection device 74. As is shown in FIG. 5, pairs of the holes 70 of the substrate 66, 68 coincide with respective ones of the auditory sensor probes 64a, 64b, 64c, 64d, etc. As light is irradiated from a side of one of the substrates, e.g., substrate 66, frequency(ies) of a sound wave 76 is determined on the basis of a light pattern 78 detected passing through the holes 70 by the light detection device 74. In one embodiment, the light detection device is a CCD camera; however, any light detection device suitable for the above described purpose may be used.

In the above described process and sensor 60, some of the light passing through the holes 70 of the first substrate 66 may be blocked temporarily by an associated auditory sensor probe vibrating due to a resonant frequency being provided by the sound wave 76. For example, should the sound wave 76 resonate the probe 64d provided at the lower right hand corner of the illustrated sensor 60, light will not pass through hole 70b of the substrate 68, such that the corresponding square or pixel 80 in the light pattern 78 in the lower right hand corner will not be illuminated at that time, as shown in FIG. 5B. It is to be appreciated that multiple probes 64 in the sensor 60 may resonant at each time under the influence of the specific frequencies of the sound wave 76, thereby providing a number of holes blocked in the substrate 68 and resulting in a light pattern at that time, such as for example, the illustrated light pattern 78.

As in shown in FIGS. 5C and 5D, in advance, resonances of the probes 64 in the sensor 60 for every frequency are mapped as a distribution of the detected light patterns f1, f2, f3, f4, f5, etc. over a time period. These light patterns 78 are registered to a computer as a library 79. Accordingly, a frequency is identifiable by comparing actual light pattern observations 81 to the stored light patterns f1, f2, etc. in the computer library 79. Moreover, based on the distribution of the light patterns in chronological order, as shown in FIG. 5D, sound localization is possible using the sensor 60.

Figure 6B:
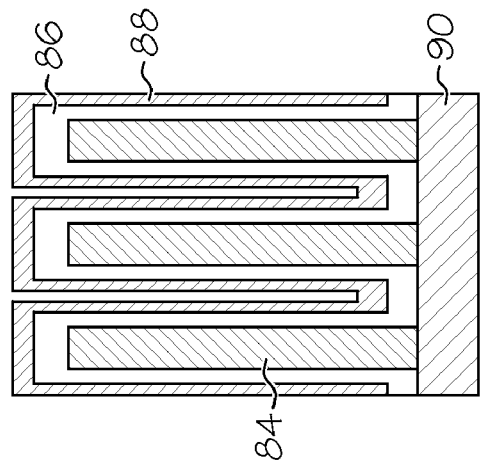
FIG. 6B is an enlarged cross-section of auditory sensor of FIG. 6A.
Figure 6A:
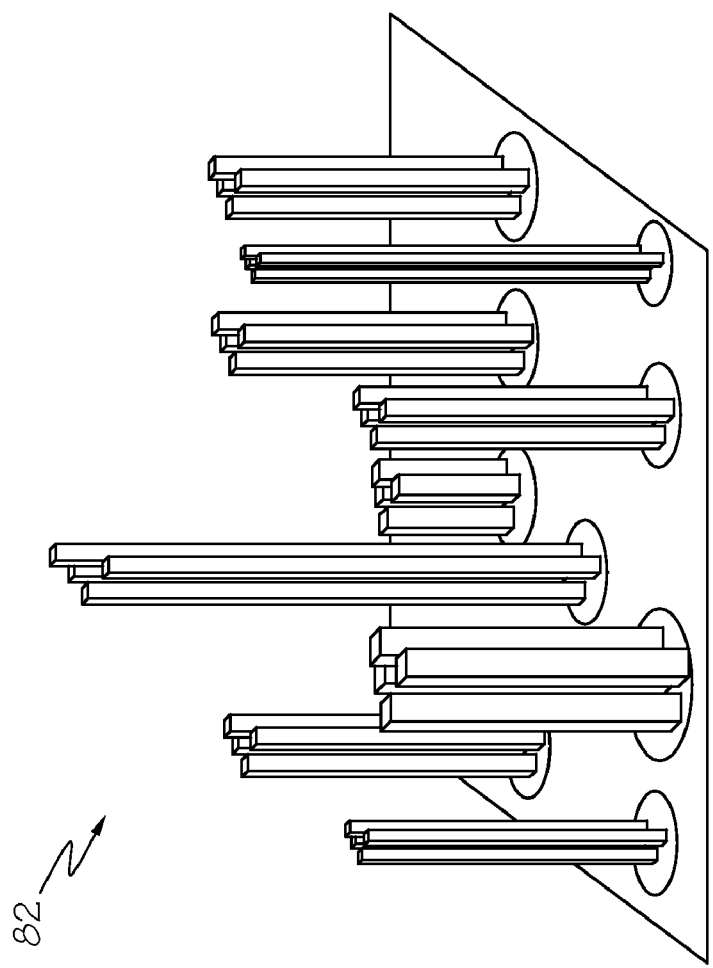
FIG. 6A is a schematic of an auditory sensor using nanotube arrays.

In the embodiment shown in FIGS. 6A and 6B, an auditory sensor 82, which uses a NT array 84 coated by a piezoelectric polymer 86 and an electrode layer 88 on a substrate 90, is provided. In this embodiment, electricity is generated when the NTs are resonated by an external sound wave. By identification of the place on which electricity is generated, a frequency is recognized.

Figure 7:
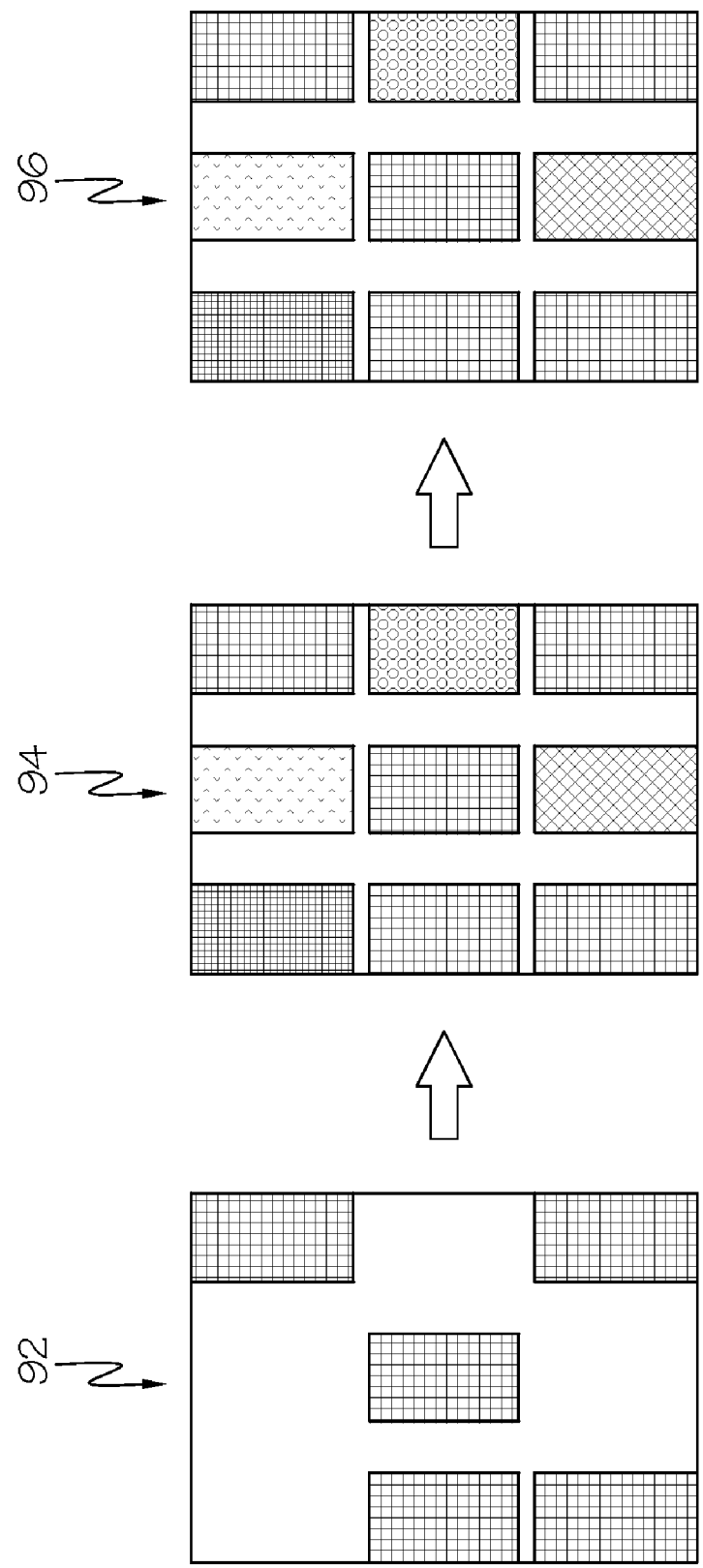
FIG. 7 is a schematic illustration of a process of making an auditory sensor using nanotube arrays.

FIG. 7 describes a method for making an auditory sensor 82 shown in FIG. 6. After masking a substrate, a catalytic metal like Fe, Ni, Mo, and Co is deposited on the substrate in step 92. Then, the mask is removed and catalytic patterns are made on the substrate. Next, in step 94, other catalytic patterns are deposited using a different mask on the substrate. In this process, a place already deposited at the first masking is covered selectively using the different mask. Then, the substrate is inserted into a furnace with a flow of an aforementioned carbon source. NTs depend on various catalysts in order to be grown and therefore, it is possible to control growth parameters of NTs, such as, for example, length and diameter. Accordingly, the result of step 94 is the synthesis of NTs with different parameters provided on the same substrate. Finally, a piezoelectric polymer, such as for example, PVDF, is coated on the surface of the NT array patterns in step 96. The coating layer can be provided using a method such as, for example, spin coating or plasma polymerization.

EXAMPLE 1

Figure 8A:
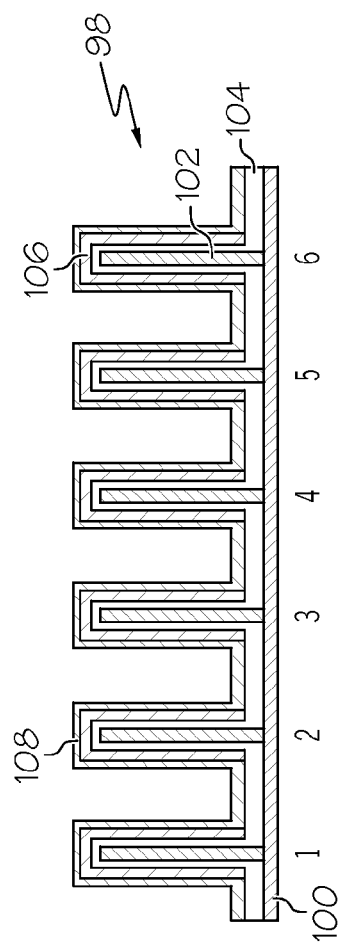
FIG. 8A is a schematic representation of a touch sensor based on aligned CNT arrays.
Figure 8B:
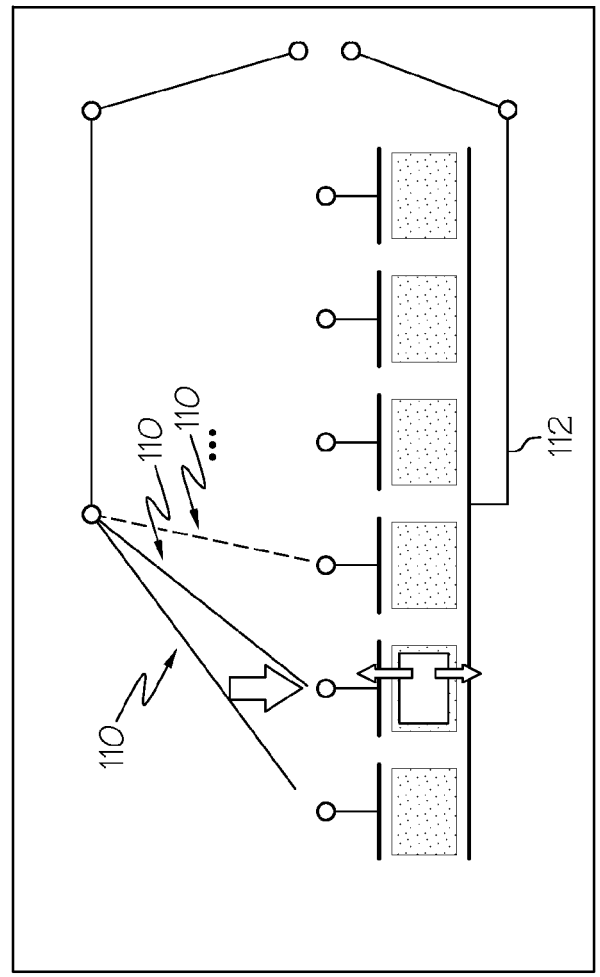
FIG. 8B is a schematic representation of the touch sensor of FIG. 8A.

As shown schematically in FIGS. 8A and 8B, a touch sensor 98 was made using vertically aligned straight CNT arrays. The CNT arrays were prepared by a thermal CVD process at 800° C. using ferrocene as a catalyst and xylene as a carbon source. The CNT arrays were created on a semi conductive substrate (SiO$_2$) and then transferred to an aluminum substrate 100. A connection between the aluminum substrate 100 and the CNT arrays was made using a carbon based adhesive. In particular, six individual CNT sensor electrodes 102 were supported by the aluminum substrate 100 and were made by cutting a 500 μm-long densely packed CNT array to the size of a 2 mm square individually. The outer walls of the CNT electrodes 102 were then coated by a thin layer of polyvinylidene fluoride (PVDF) 104 as a piezoelectric polymer. A thin gold layer was sputter-coated onto the PVDF-coating 104 to construct another electrode 106. Finally, the whole device was encapsulated with a thin layer of an elastomer (silicon rubber) 108 to ensure the softness and durability of the sensor 98. A wire lead 110 was extracted from the top surface of each of the sensor probes individually, whereas a common wire lead 112 to all of the six sensor probes was attached at the bottom. The physical size of this sensor was 40 mm in length, 8 mm in width, and 4 mm in thickness.

Figure 9A:
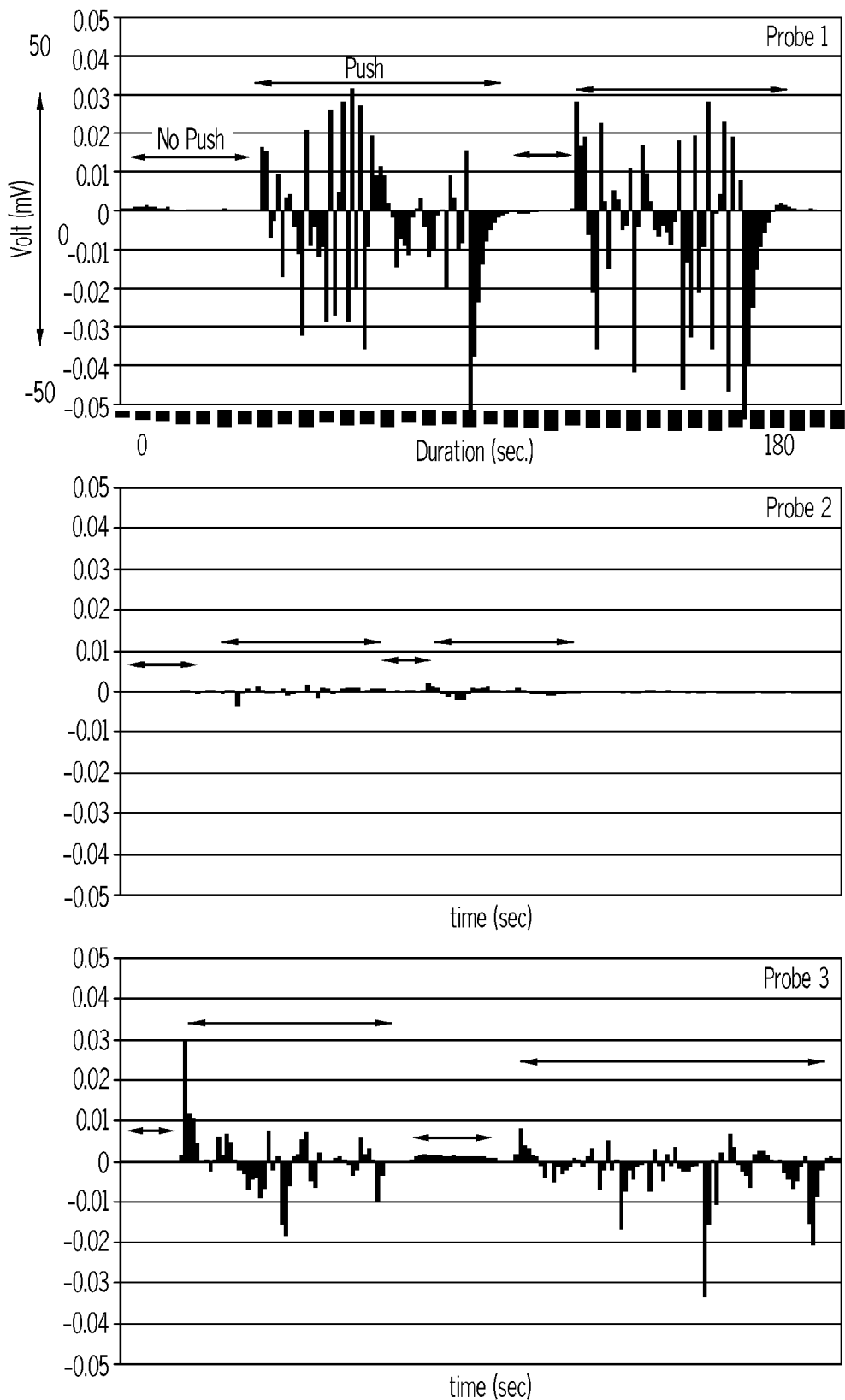
FIG. 9 are plots showing sensing data for the individual touch sensor probes numbered in FIG. 8.
Figure 9B:
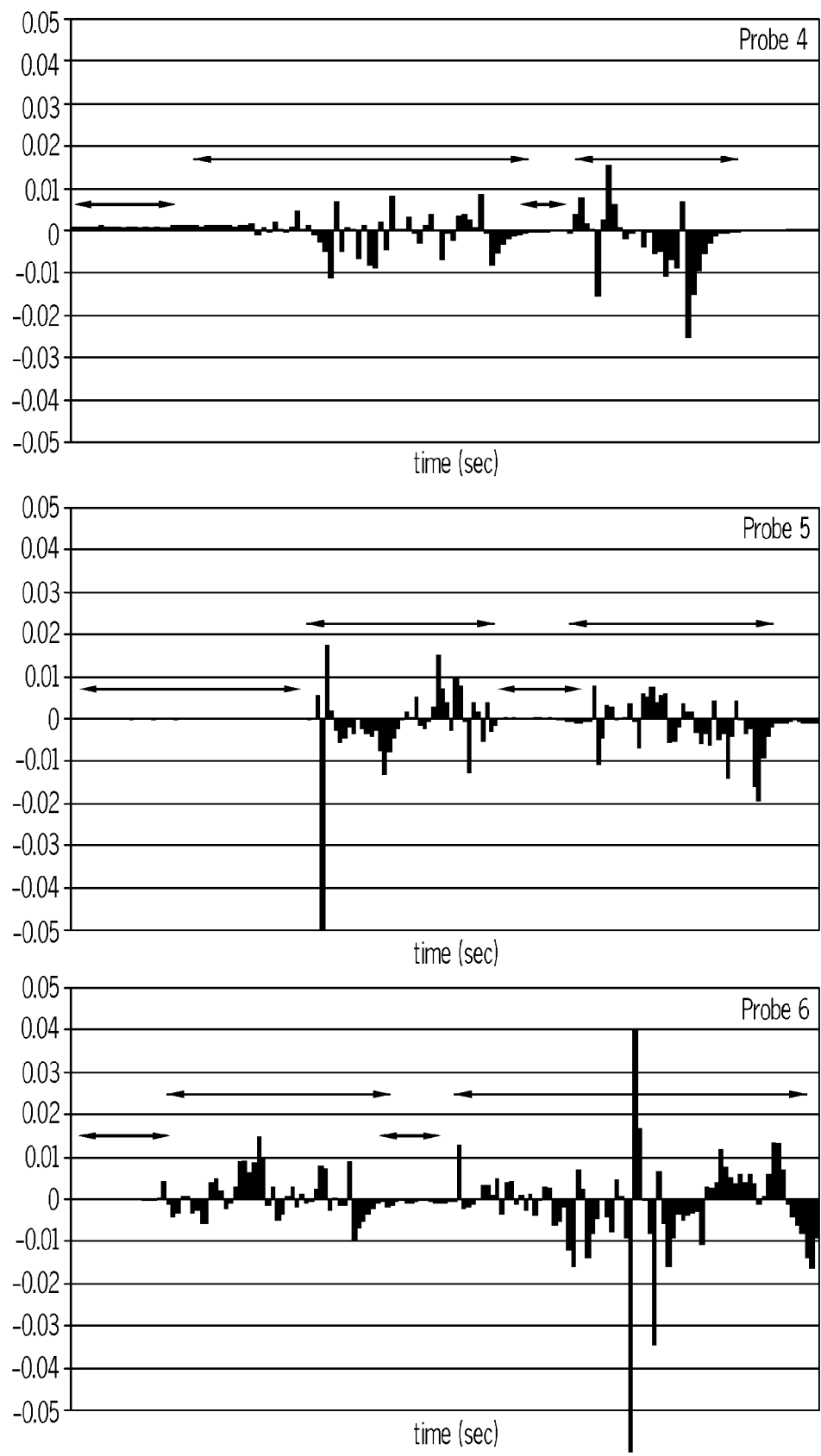

The touch sensor was tested by touching/pushing with a finger, and the sensing results are shown in FIG. 9. The sensing signal from each sensor probe was independently recorded. FIG. 9 clearly shows that for all probes, the appearance and disappearance of the electric voltages upon touching/pushing the sensor with a finger and removing the finger from the sensor, respectively, were detected. As shown, voltage signals with the maximum value of + and − in the range from 40 to 50 mV were generated. The observation of the bipolar signals is probably because the PVDF coating covers the whole surface of aligned CNTs. Namely, the coating causes the expansion at the one side of the PVDF coating and contraction on the other side upon torsion of the CNT by a loading force.

EXAMPLE 2

The Preparation of a Patterned Array of a Sensor

Figure 10B:
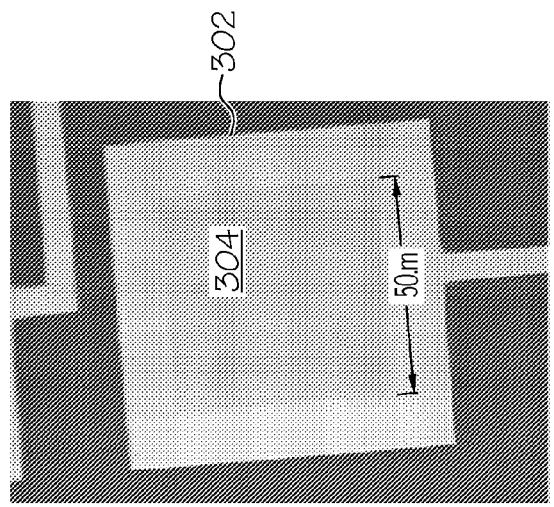
FIG. 10B is a portion of the sensor of FIG. 10A.
Figure 10C:
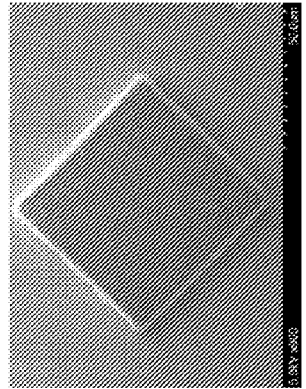
FIG. 10C is a photograph showing CNTs grown a portion of the sensor of FIG. 10A.
Figure 10A:
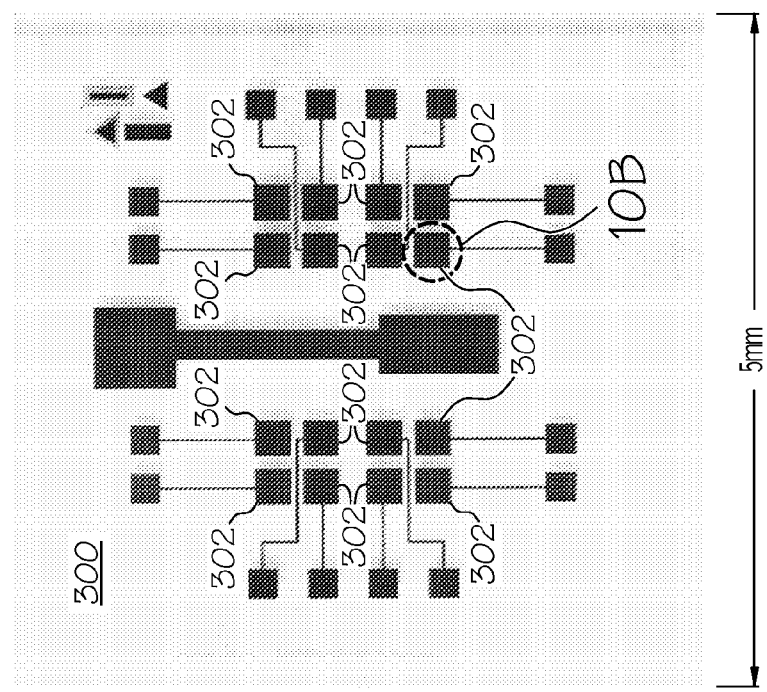
FIG. 10A is a photograph of the pattern of a touch sensor after metal deposition on a substrate.

A patterned array of a sensor was prepared on an $Al_2O_3$ substrate, which had 16 individual sensor probes, as shown in FIG. 10A. A gold padding substrate was pre-laid down underneath of the sensor probes for addressing the sensor units. To support the growth of vertically aligned CNTs within each of the patterned sensor probes, chromium (Cr) was first selectively deposited into the patterned area shown in FIG. 10B on a pristine $Al_2O_3$ substrate by photolithographic patterning. Then, iron (Fe) catalyst was selectively deposited onto the small squared area 304 within the Cr-covered square patterned regions (FIG. 10B). Thereafter, the metal patterned substrate was inserted to a furnace to synthesize the CNT array. The synthesis of the CNT array was done under decreased pressure with flowing of an acetylene gas and a hydrogen gas at 750° C. A vertically aligned CNT array thus prepared is shown in FIG. 10C. The CNT array was grown only on the Fe-deposited area. Polyvinylidene fluoride (PVDF) dispersed in N,N-dimethylformamide (DMF) was deposited onto the sensor probe area using a physical mask to cover the electrode region. The PVDF coating was dried by heating at 90° C. Finally, a solution mixture containing silver powders and ethylene vinyl acetate copolymer was mounted as a flexible electrode on the PVDF. Finally, the poling treatment for the sensor unit was done under an electrical field up to 50 $\mu m^{-1}$ at 90° C. using a DC voltage supply.

Voltage Signal Detection Test

Figure 11:
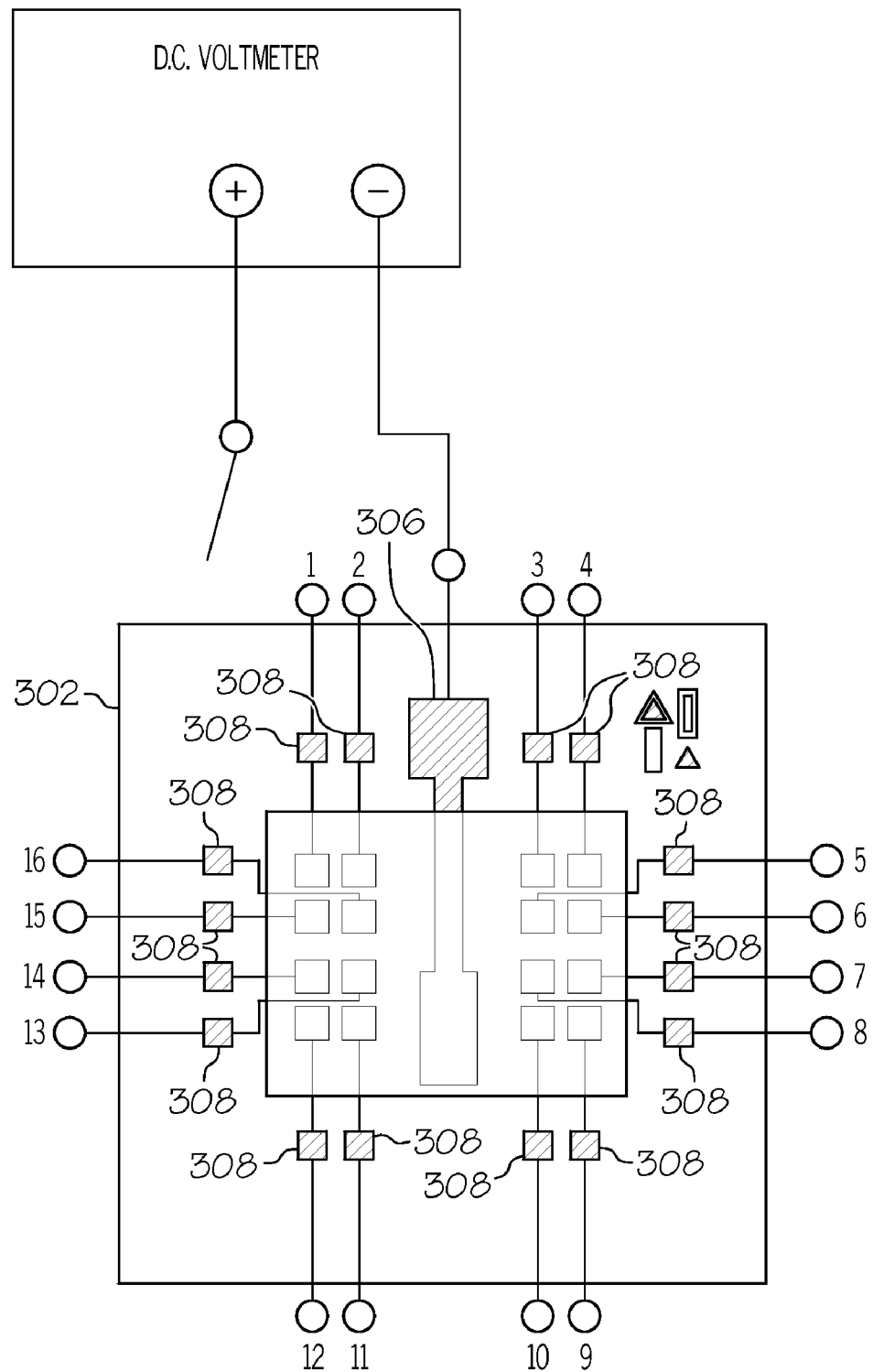
FIG. 11 a schematic of the touch sensor of FIG. 10A after formation.
Figure 12:
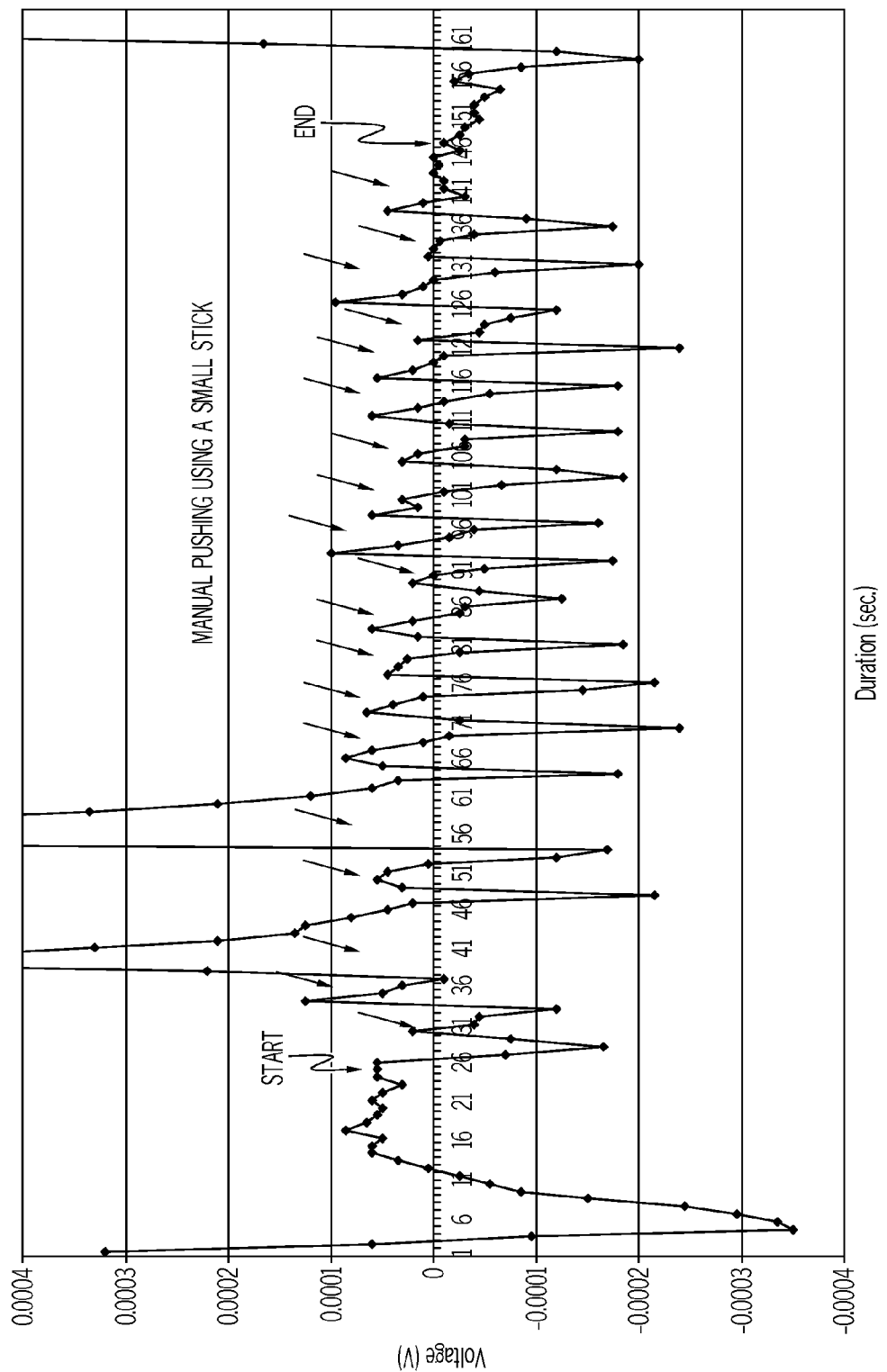
FIG. 12 is a graph showing the result of the voltage signal detection using the touch sensor of FIG. 11.

The voltage signal detection test was done using the sensor unit of FIG. 11, which includes one common electrode 306 with other electrode being selected from the numbered terminals 308 between 1 and 16. One side of the electrode on the sensor unit was covered by an aluminum foil to enhance the output signal by summarizing all of the measured. The touching stimulation was provided by using a small stick loaded manually. FIG. 12 shows the results from the voltage detection test, which shows the "on" and "off" signals in response to the actions of the "push on" and "pull off", respectively. Although the voltage signals are not uniform because of the manual loading, the range of the signals is approximately between 0.1 mV to −0.2 mV.

Figure 13:
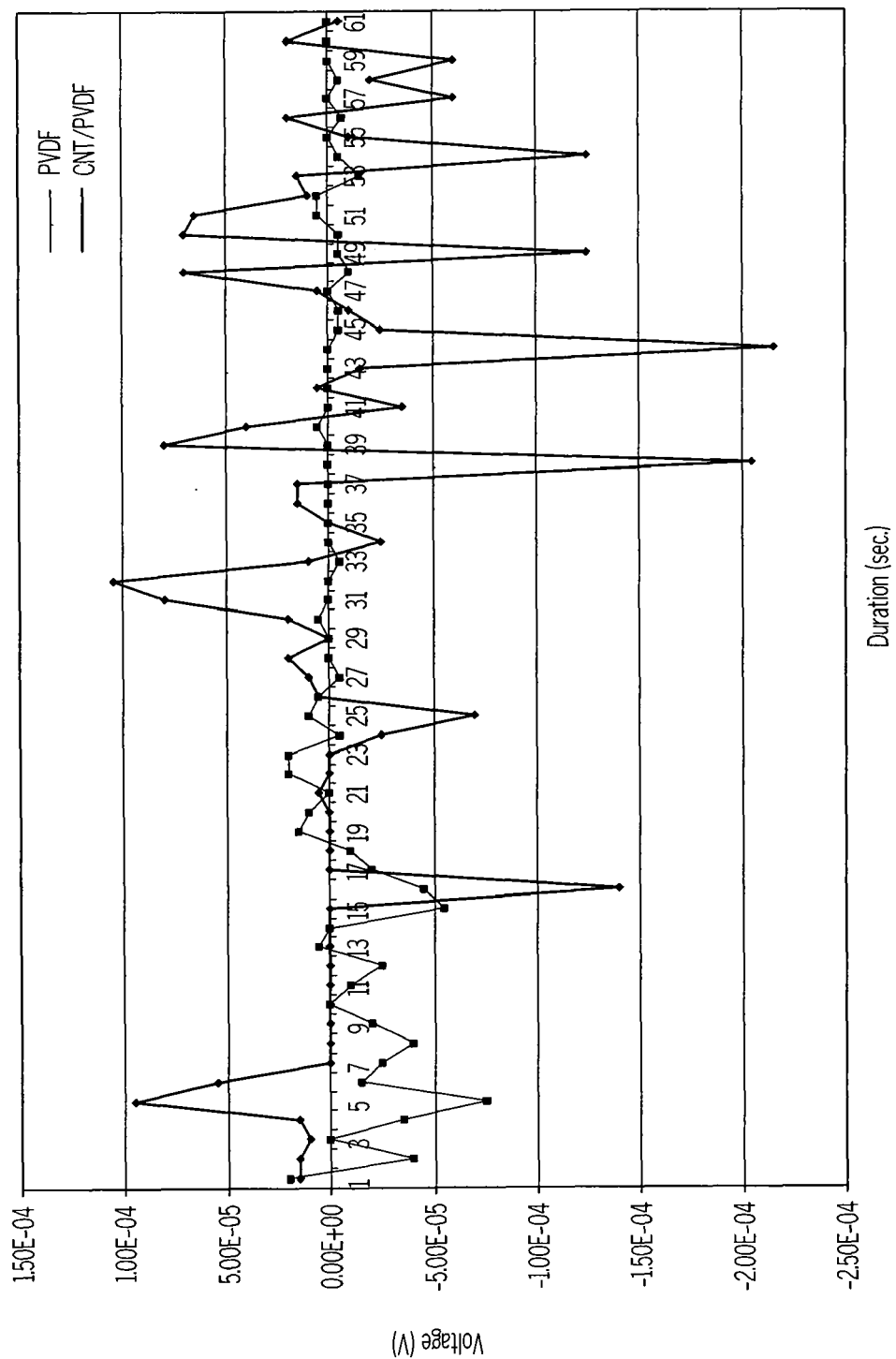
FIG. 13 is a graph showing a comparison of the signal detection test results for a CNT/PVDF sensor and a PVDF sensor.

For comparison, a sensor with only a PVDF coating (PVDF sensor) on the metal patterned substrate without CNTs was also prepared and tested separately. As shown in FIG. 13, the voltage signals created by CNT/PVDF sensor are much larger than signals by PVDF sensor.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

The invention claimed is:

1. A sensor comprising:
   at least one sensor probe comprising:
      a pair of electrodes;
      a vertically aligned nanotube disposed between the pair of electrodes, the nanotube having a first end and a second end, one of the pair of electrodes at the first end of the nanotube and the other electrode at the second end;
      a piezoelectric polymer on the nanotube; and
      a field source for generating a field, the field source operatively connected to the pair of electrodes;
      whereby when the sensor probe is touched, a change in the field occurs or electricity is generated.

2. The sensor of claim 1 further comprising a detector operatively connected to the at least one sensor probe, the detector detecting the change in the field or the electricity.

3. The sensor of claim 2 wherein the detector is selected from voltage detectors, current detectors, light detectors, or combinations thereof.

4. The sensor of claim 1 wherein the nanotube is selected from straight nanotubes, helical nanotubes, or combinations thereof.

5. The sensor of claim 1 wherein the nanotube is selected from individual nanotubes, bundled nanotubes, or combinations thereof.

6. The sensor of claim 1 wherein the nanotube is selected from carbon nanotubes, metal nanotubes, metal oxide nanotubes, metal carbide nanotubes, metal nitride nanotubes, metal boride nanotubes, ceramic nanotubes, polymer nanotubes, or silicon nanotubes, or combinations thereof.

7. The sensor of claim 1 wherein the piezoelectric polymer is selected from polyvinylidene fluoride, or combinations thereof.

8. The sensor of claim 1 wherein the field source is a voltage source.

9. The sensor of claim 1 wherein the sensor is a touch sensor, wherein the nanotube is a helical nanotube, and wherein the field source is a voltage source electrically connected to the electrodes, whereby when the sensor probe is touched, a change in the electric field occurs.

10. A method of detecting touch comprising:
    providing a sensor comprising:
       at least one sensor probe comprising:
          a pair of electrodes;
          a vertically aligned nanotube disposed between the pair of electrodes, the nanotube having a first end and a second end, one of the pair of electrodes at the first end of the nanotube and the other electrode at the second end;
a piezoelectric polymer on the nanotube; and
a field source for generating a field, the field source operatively connected to the pair of electrodes;
whereby when the sensor probe is touched, a change in the field occurs or electricity is generated; and detecting a change in the field or the electricity generation caused by a touch.

11. The method of claim 10 wherein the sensor is a touch sensor, wherein the nanotube is a helical nanotube, and wherein the field source is a voltage source electrically connected to the electrodes, whereby when the sensor probe is touched, a change in the electric field occurs.

* * * * *